(12) United States Patent
Rance et al.

(10) Patent No.: US 9,420,030 B2
(45) Date of Patent: Aug. 16, 2016

(54) SYSTEM AND METHOD FOR DISTRIBUTING WEB EVENTS VIA DISTRIBUTION CHANNELS

(75) Inventors: Peter Rance, London (GB); Dorian Logan, London (GB); Kenneth Winter, London (GB)

(73) Assignee: BrightTALK Ltd., London (GB)

( * ) Notice: Subject to any disclaimer, the term of this patent is extended or adjusted under 35 U.S.C. 154(b) by 0 days.

(21) Appl. No.: 12/969,443

(22) Filed: Dec. 15, 2010

(65) Prior Publication Data
US 2012/0158888 A1 Jun. 21, 2012

(51) Int. Cl.
| | |
|---|---|
| *G06F 15/16* | (2006.01) |
| *G01R 31/08* | (2006.01) |
| *H04L 29/08* | (2006.01) |
| *G06F 17/30* | (2006.01) |
| *H04L 12/24* | (2006.01) |
| *G06Q 30/02* | (2012.01) |

(52) U.S. Cl.
CPC .......... *H04L 67/025* (2013.01); *G06F 17/3089* (2013.01); *G06Q 30/02* (2013.01); *H04L 41/0896* (2013.01); *H04L 67/02* (2013.01); *H04L 67/26* (2013.01)

(58) Field of Classification Search
CPC ............... H04L 29/06; H04L 29/08576; H04L 29/08072; H04L 29/0809; H04L 29/06095; H04L 12/585; H04L 12/58; H04L 12/581; H04L 12/5855; H04L 45/28; H04L 45/22; H04L 29/14; H04L 45/00; H04L 12/2422; G06Q 10/107

USPC ................................................... 709/227, 206
See application file for complete search history.

(56) References Cited

U.S. PATENT DOCUMENTS

| | | |
|---|---|---|
| 5,565,923 A | 10/1996 | Zdepski |
| 6,442,598 B1 | 8/2002 | Wright et al. |
| 6,728,753 B1 | 4/2004 | Parasnis et al. |
| 6,728,759 B1 | 4/2004 | Na |
| 6,760,749 B1 | 7/2004 | Dunlap et al. |
| 6,774,926 B1 | 8/2004 | Ellis et al. |
| 7,050,603 B2 | 5/2006 | Rhoads et al. |
| 7,142,250 B1 | 11/2006 | Black |
| 7,328,239 B1 | 2/2008 | Berberian et al. |
| 7,369,515 B2 | 5/2008 | Salesky et al. |
| 7,412,533 B1 | 8/2008 | Johnson et al. |

(Continued)

OTHER PUBLICATIONS

Office Action, Jan. 21, 2011, U.S. Appl. No. 12/004,532, filed Dec. 21, 2007.

(Continued)

*Primary Examiner* — David Lazaro
*Assistant Examiner* — Mahran Abu Roumi
(74) *Attorney, Agent, or Firm* — Carr & Ferrell LLP

(57) ABSTRACT

A system, method, and computer program for distributing web events via distribution channels are provided. A web event is established in an origination channel. One or more parameters associated with the web content may be identified. The web event is then added to one or more distribution channels based on the one or more parameters. The web event is then distributed to one or more identified users via the one or more distribution channels.

16 Claims, 11 Drawing Sheets

(56) References Cited

U.S. PATENT DOCUMENTS

| | | | |
|---|---|---|---|
| 7,751,347 | B2 | 7/2010 | Giroti |
| 8,446,846 | B1 | 5/2013 | Saleem et al. |
| 8,514,762 | B2 | 8/2013 | Du Hart, IV et al. |
| 9,015,570 | B2 | 4/2015 | Rance et al. |
| 9,032,441 | B2 | 5/2015 | Rance et al. |
| 2001/0047516 | A1 | 11/2001 | Swain et al. |
| 2002/0016858 | A1 | 2/2002 | Sawada et al. |
| 2002/0036694 | A1 | 3/2002 | Merril |
| 2002/0103696 | A1 | 8/2002 | Huang et al. |
| 2002/0104096 | A1 | 8/2002 | Cramer et al. |
| 2002/0116297 | A1 | 8/2002 | Olefson |
| 2002/0120939 | A1 | 8/2002 | Wall et al. |
| 2002/0198943 | A1* | 12/2002 | Zhuang .............. H04L 29/06 709/206 |
| 2003/0034999 | A1 | 2/2003 | Coughlin, III et al. |
| 2003/0124502 | A1 | 7/2003 | Chou |
| 2003/0158816 | A1 | 8/2003 | Rouse |
| 2003/0200001 | A1 | 10/2003 | Goddard |
| 2004/0032424 | A1 | 2/2004 | Florschuetz |
| 2004/0153504 | A1 | 8/2004 | Hutchinson et al. |
| 2004/0193683 | A1 | 9/2004 | Blumofe |
| 2004/0225728 | A1 | 11/2004 | Huggins et al. |
| 2004/0243922 | A1 | 12/2004 | Sirota et al. |
| 2005/0076387 | A1 | 4/2005 | Feldmeier |
| 2005/0125453 | A1 | 6/2005 | Rozack |
| 2005/0160367 | A1 | 7/2005 | Sirota et al. |
| 2006/0104347 | A1 | 5/2006 | Callan et al. |
| 2006/0111903 | A1* | 5/2006 | Kemmochi .......... G10H 1/0091 704/244 |
| 2006/0179454 | A1 | 8/2006 | Shusman |
| 2007/0044133 | A1 | 2/2007 | Hodecker |
| 2007/0078768 | A1 | 4/2007 | Dawson |
| 2007/0118396 | A1 | 5/2007 | Matz et al. |
| 2008/0195743 | A1 | 8/2008 | Brueck et al. |
| 2008/0196079 | A1* | 8/2008 | Lee ...................... H04N 21/235 725/139 |
| 2008/0282293 | A1* | 11/2008 | Frechter ................ H04N 7/163 725/58 |
| 2009/0019374 | A1 | 1/2009 | Logan et al. |
| 2009/0024923 | A1 | 1/2009 | Hartwig et al. |
| 2009/0037520 | A1 | 2/2009 | Loffredo |
| 2009/0055385 | A1 | 2/2009 | Jeon et al. |
| 2009/0070407 | A1 | 3/2009 | Castle et al. |
| 2009/0164875 | A1* | 6/2009 | Rance ................... G06Q 30/06 715/201 |
| 2009/0164876 | A1* | 6/2009 | Logan ................ H04L 65/4015 715/201 |
| 2009/0286509 | A1 | 11/2009 | Huber et al. |
| 2010/0058410 | A1 | 3/2010 | Rance et al. |
| 2010/0088126 | A1* | 4/2010 | Iaia ........................ G06Q 10/02 705/5 |
| 2010/0293048 | A1* | 11/2010 | Singolda ................ G06Q 30/02 705/14.43 |
| 2012/0191582 | A1 | 7/2012 | Rance et al. |

OTHER PUBLICATIONS

Final Office Action, Aug. 8, 2011, U.S. Appl. No. 12/004,532, filed Dec. 21, 2007.
Advisory Action, Oct. 19, 2011, U.S. Appl. No. 12/004,532, filed Dec. 21, 2007.
Office Action, Aug. 17, 2011, U.S. Appl. No. 12/151,768, filed May 8, 2008.
Final Office Action, Feb. 29, 2012, U.S. Appl. No. 12/151,768, filed May 8, 2008.
Advisory Action, Jul. 18, 2012, U.S. Appl. No. 12/151,768, filed May 8, 2008.
Office Action, Aug. 23, 2013, U.S. Appl. No. 12/151,768, filed May 8, 2008.
Office Action, Jun. 7, 2011, U.S. Appl. No. 12/231,493, filed Sep. 2, 2008.
Final Office Action, Nov. 16, 2011, U.S. Appl. No. 12/231,493, filed Sep. 2, 2008.
Advisory Action, Jan. 26, 2012, U.S. Appl. No. 12/231,493, filed Sep. 2, 2008.
Office Action, Jul. 6, 2013, U.S. Appl. No. 12/231,493, filed Sep. 2, 2008.
Final Office Action, Aug. 1, 2013, U.S. Appl. No. 12/231,493, filed Sep. 2, 2008.
Office Action, Oct. 15, 2012, U.S. Appl. No. 13/011,652, filed Jan. 21, 2011.
Final Office Action, Aug. 13, 2013, U.S. Appl. No. 13/011,652, filed Jan. 21, 2011.
Notice of Allowance, Dec. 12, 2013, U.S. Appl. No. 13/011,652, filed Jan. 21, 2011.
U.S. Appl. No. 12/004,532, Peter Rance, System and Method for Providing a Web Event Channel Player, filed Dec. 21, 2007.
U.S. Appl. No. 12/151,768, Dorian Logan, Systems and Methods for Integrating Live Audio Communication in a Live Web Event, filed May 8, 2008.
U.S. Appl. No. 12/231,493, Peter Rance, System and Method for Self Management of a Live Web Event, filed Sep. 2, 2008.
U.S. Appl. No. 13/011,652, Peter Rance, Lead Generation for Content Distribution Service, filed Jan. 21, 2011.
Non-Final Office Action, Apr. 8, 2014, U.S. Appl. No. 12/004,532, filed Dec. 21, 2007.
Notice of Allowance, Dec. 3, 2014, U.S. Appl. No. 12/004,532, filed Dec. 21, 2007.
Final Office Action, Jul. 16, 2014, U.S. Appl. No. 12/151,768, filed May 8, 2008.
Final Office Action, Aug. 28, 2014, U.S. Appl. No. 12/151,768, filed May 8, 2008.
Non-Final Office Action, Mar. 25, 2014, U.S. Appl. No. 12/231,493, filed Sep. 2, 2008.
Notice of Allowance, Oct. 15, 2014, U.S. Appl. No. 12/231,493, filed Sep. 2, 2008.

* cited by examiner

FIG. 5

WEBCASTING — Manage | Peter Rance | United Kingdom–London | Profile | Logout

BrightTALK > Start Webcasting > My BrightTALK

Home >> My BrightTALK >> Webcasting Reinvented: Webcasts

Vender ABC Channel

Tabs: WEBCASTS | SUBSCRIBERS | PROMOTION | SETTINGS | HELP

> Search All Webcasts  
Presenting a webcast? > Click here

[Create] — 504

500 — (window); 502 — (right column group)

| DATE & TIME (GMT) | TITLE | PRESENTER | STATUS | REG | VIEWS | HOURS | RATING | |
|---|---|---|---|---|---|---|---|---|
| Total | | | | 625 | 5263 | 35:56 | ***** | |
| 09/11/2007 13:00hrs | Year End Business Assessment 28020 | Hugh Fearnly-Whitting... | Upcoming | 0 | n/a | 00:00 | ***** | Manage |
| 08/11/2007 10:00hrs | Lorem Ipsum Quarterly Update 28020 | Peter Saake | Upcoming | 26 | n/a | 00:00 | ***** | Manage |
| 08/11/2007 13:00hrs | Quarterly Update Consetetur 28020 | Alan Parker | Upcoming | 72 | n/a | 00:00 | ***** | Manage |
| 08/11/2007 08:30hrs | Quarterly Update – Adpiscing 29025 | Thomas Jones | Upcoming | 8 | n/a | 00:00 | ***** | Manage |
| 07/11/2007 13:00hrs | Lorem ipsum dolor sit amet consectetur 28020 | Peter Rance | Upcoming | 293 | n/a | 00:00 | ***** | Manage |
| 07/11/2007 10:00hrs | Next-Enchanted Business Reporting | Jeremy Moore | Recorded | 139 | 157 | 13:45 | ***** | Manage |
| 06/11/2007 11:00hrs | Tempor incididunt ut labore et dolore magna 25020 | David Johnson | Recorded | 923 | 738 | 09:41 | ***** | Manage |
| 06/11/2007 12:30hrs | Ut enim ad minim veniam | Katherine Peterson | Recorded | 52 | 3081 | 21:18 | ***** | Manage |
| 06/11/2007 13:00hrs | Qius nostrud exercitation ullamco laboris 25020 | Delia Hammond | Recorded | 108 | 283 | 04:52 | ***** | Manage |
| 04/11/2007 15:45hrs | Nisr ut aliquip ex ea commodo consequat | Thomas Jones | Recorded | 175 | 78 | 12:37 | ***** | Manage |
| 04/11/2007 13:30hrs | Tempor incididunt ut labore et dolore | Peter Rance | Recorded | 39 | 110 | 07:21 | ***** | Manage |
| 03/11/2007 12:00hrs | Tempor incididunt ut labore et dolore magna 25020 | Jeremy Moore | Recorded | 84 | | | | Manage |

WEBCASTING                                          Manage | Peter Rance | United Kingdom-London | Profile | Logout BrightTALK    > Start Webcasting    > My BrightTALK                    [       ] > Search All Webcasts Home >> My BrightTALK >> Webcasting Reinvented: Webcasts                Presenting a webcast? > Click here Vender ABC Channel

| WEBCASTS | SUBSCRIBERS | PROMOTION | SETTINGS | HELP |

Promoting this channel

We are always thinking of new ways
to help you promote your site and
build your website's viewings. See
below for our current range of
ready to use tools:

Add webcasts to your campaign

Add all webcasts in the channel into the campaign ☐
                                                  — 702

| Date | Webcast | Status | |
|---|---|---|---|
| 12/4/2008 | Data warehousing 101 | Upcoming | ☐ |
| 1/3/2008 | Databases advanced | Recorded | ☐ |
| 25/2/2008 | Data techniques | Recorded | ☐ |
| 12/1/2008 | DB Demo 1 | Recorded | ☐ |
| 31/1/2008 | DB Demo 2 | Recorded | ☐ |
| 13/1/2008 | DB Demo 3 | Recorded | ☐ |

FIG. 7

WEBCASTING | Manage | Peter Rance | United Kingdom-London | Profile | Logout

BrightTALK > Start Webcasting > My BrightTALK | > Search All Webcasts

Home >> My BrightTALK >> Webcasting Reinvented: Webcasts | Presenting a webcast? > Click here

Media Company Channel

| WEBCASTS | SUBSCRIBERS | PROMOTION | SETTINGS | HELP |

Earn money by adding 3rd party content
We estimate you could currently earn $2000-$5000/month | Add 3rd Party Webcasts | Create Webcast Add 3rd Party webcast and earn money Step 2 Select Webcast Campaigns Sort by scheme ▽ — 816

| Campaign | Channel | Webcasts | Ratings | Scheme | Rate | Select |
|---|---|---|---|---|---|---|
| Campaign 24 | Database channel | 23 | **** | PPV | $10.99 | ☐ |
| PPV Cam | Data Live! | 45 | **** | PPV | $9.35 | ☐ |
| PPS UK June 08 | Vender ABC channel | 23 | **** | PPS | $10.35 | ☐ |
| Warehousing channel PPL 08 | Warehousing channel | 78 | **** | PPS | $49.00 | ☐ |
| Database techniques PPC 07-08 | Database techniques | 234 | **** _808_ | PPV _810_ | $10.35 | ☐ |
| Warehousing channel 2- Lead gen 06  _802_ | Warehousing channel 2  _804_ | 78 _806_ | **** | PPV | $10.35 _812_ | ☐ _814_ |

FIG. 8

SYSTEM AND METHOD FOR DISTRIBUTING WEB EVENTS VIA DISTRIBUTION CHANNELS

BACKGROUND

1. Field of the Invention

The present invention relates generally to web events, and more particularly to systems and methods for distributing web events via distribution channels.

2. Background Art

Using the Internet to distribute videos is becoming increasingly prevalent. For example, YouTube allows a distributor to embed pre-recorded videos within a webpage. Typically, the pre-recorded videos are embedded by inserting a piece of code for each video. The code will provide a link to the video when activated.

The distributor may upload pre-recorded videos to a content provider. The content provider may then provide a list of the uploaded pre-recorded videos on an associated website. Viewers may then access the pre-recorded videos via the associated website.

Disadvantageously, these distribution schemes are typically not organized in a topic-specific or categorized way. Instead, it may comprise a random gathering of pre-recorded videos. Additionally, future content is not advertised in any way, and there is no economic incentive to the content provider or the content distributor.

SUMMARY OF THE INVENTION

A system, method, and computer program for distributing web events via distribution channels are provided. A web event is established in an origination channel. In exemplary embodiments, the web event may be established by any content provider or channel owner. When establishing the web event, one or more parameters may be associated with the web event.

Subsequently, the one or more parameters (e.g., classification, category, criteria) associated with the web event may be identified. Based on the one or more parameters, the web event may be added to one or more distribution channels. In one embodiment, the web event may be automatically added to the distribution channel(s). In another embodiment, the web event may be provided to a distribution channel owner, who can decide whether to select the web event for addition to their distribution channel(s). In some embodiments, the web event may be a part of a campaign comprising a plurality of web events, which may be added in whole to the distribution channel(s). The web event is then distributed to one or more identified users via the distribution channel(s).

BRIEF DESCRIPTION OF THE DRAWINGS

FIG. 5 is an interface providing web event information for a distribution channel.

FIG. 7 is an interface for adding webcasts to a channel.

FIG. 8 is an interface for managing a campaign for a channel.

DESCRIPTION OF EXEMPLARY EMBODIMENTS

Figure 1:
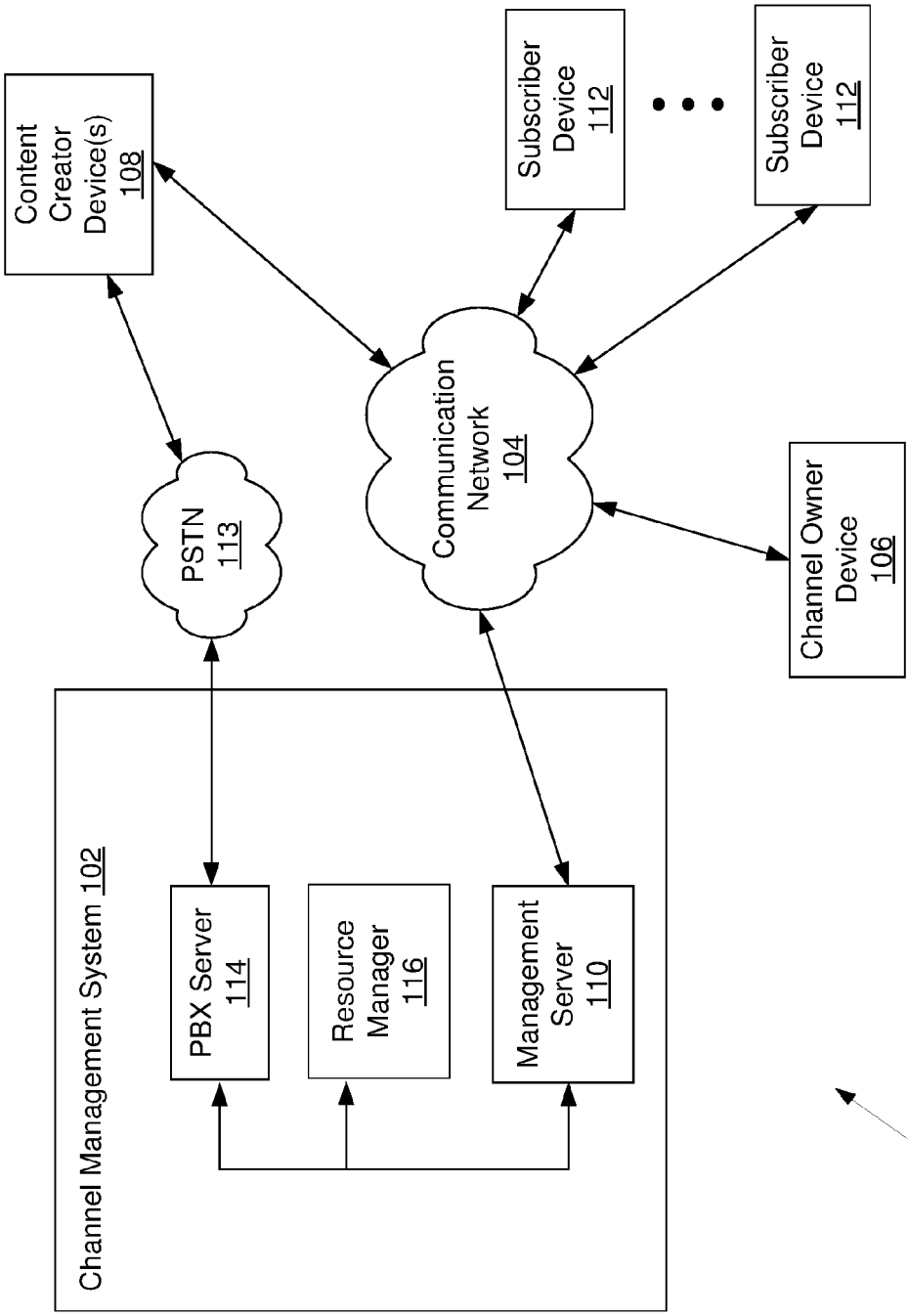
FIG. 1 shows an exemplary environment for providing web content via distributed channels.

The present technology distributes content via distribution channels. The present technology provides a network that allows a user to own and manage a channel. A channel owner may provide content through a channel, schedule future content to provide through the channel, and provide access to past content provided through the channel. The content may include images, audio, video, documents such as slide shows, and other digital content. The content may be created by a user or accessed by a user from another source. For example, a channel owner may provide content from another channel in the owner's own channel. A channel may be provided through a distribution channel web service, a web site provided by the channel owner, or some other network accessible location. Each channel may be a distributed channel, which is a channel that provides content originally from another channel.

In exemplary embodiments, a channel player may be embedded within a content page, such as for example a website, and thereby provide content through a network browser which accesses the content page. The network browser may be suitable for use with a desktop computer, laptop computer, and net book computer.

The channel player may also be accessed by a network browser suitable for use on mobile devices. Hence, the channel player may be accessed or viewable via an application or provisioned service hosted by a mobile device capable of communicating over the Internet. The mobile device is inclusive of cellular telephones, smart phones, personal digital assistants (PDAs), wireless e-mail devices, and handheld computing devices.

The channel player comprises an interface configured to provide access to a distribution channel comprising past, current, and future web events, such as webcasts. In exemplary embodiments, the distribution channel is an instance of a channel configured to distribute content, such as web events, from multiple creators and/or sources. The content may be aggregated into a single list of content available via a particular distribution channel. Examples of providing a web event channel player are described in U.S. patent application Ser. No. 12/004,532, filed Dec. 21, 2007 and entitled "System and Method for Providing a Web Event Channel Player," which is hereby incorporated by reference.

One or more distribution channels may be embedded into any website or accessible via an application or provisioned service hosted by a mobile device, and the distribution channel may present content from any source. Accordingly, a user (e.g., distribution channel owner) may present content generated by other users via an origination channel, and/or the user (e.g., content provider) may provide content to be presented by a distribution channel owner. A channel owner may monetize a channel by billing or charging a fee to other users (i.e., content providers) who wish to provide their content through the owner's channel.

A user may register (i.e., create an account) to access the service and distribute content (e.g., registered user) provided by the present technology. In other embodiments, a user may access the service and content as an unregistered user (e.g., anonymous user). For purposes of discussion, various embodiments of the invention are in described in the context of registered users although the description is not intended to be limited to such users.

FIG. 1 shows an exemplary environment for providing web content via distributed channels. According to exemplary embodiments, a distribution channel may include a grouping of web events or web content based on subject matter or categories. For example, a distribution channel may exist for financial fund management subject matter.

The exemplary environment 100 comprises a channel management system 102 in communication via a communication network 104 to a channel owner device 106. The communication network 104 may comprise an intranet, the Internet, wide area network, local area network, public network, private network, or a combination of these.

The exemplary channel player comprises an interface configured to provide access to the distribution channel comprising past, current, and future web events. These web events may include any content, including, for example, presentations or slide shows that are synchronized with live audio. Each distribution channel may be designated for a specific subject matter or content. As such, each distribution channel may be utilized to distribute various web events associated with a defined category, as discussed herein.

The channel owner device 106 may comprise any computing device associated with a distribution channel owner configured to distribute information. The distribution channel owner may comprise any entity that desires to provide a medium for disseminating information. A distribution channel provided by the distribution channel owner may be directed to a particular subject matter, audience member, audience group, community, or any other group that is associated with the distribution channel owner. For example, an investment company may provide a distribution channel that is directed to mutual fund and stock investment events. In some embodiments, one or more distribution channels may be associated with the distribution channel owner. For example, a company may feature a distribution channel for investment fund management and another distribution channel for corporate governance on the company's website or on multiple websites associated with the company.

As discussed herein, channels may be utilized to create (i.e., origination channels) and/or distribute (i.e., distribution channels) content, such as web events. It should be noted that the distribution channel owner, as used herein, may refer to any individual that performs actions on behalf of an actual distribution channel owner (e.g., an employee of the distribution channel owner).

In exemplary embodiments, the distribution channel owner embeds a code associated with their distribution channel and channel player in a website owned, provided by, or associated with the owner via the channel owner device 106. The code comprises one or more instructions executable by a processor. According to exemplary embodiments, access to the channel player is provided by embedding a piece of software code (e.g., single line of code) within a webpage where access to the channel player is desired. This single piece of software code will activate an instance of the channel player on a user's computing device (e.g., subscriber device 112), which will provide access to the distribution channel.

A channel may be distributed to multiple locations. For example, a channel may be streamed to several content pages (such as websites) and other locations. As such, the content provided by a distribution channel may be accessible from multiple locations. Embedded code within a content page that provides the channel may communicate with the service provided by the present technology. The embedded code, such as for example script code, may monitor the traffic or activities associated with a particular location providing content for the channel The monitored traffic and activity associated with the particular location may be tracked and provided to the distribution service. The distribution service may then provide information for each location, such as content traffic information, to the owner of the content being broadcast.

Any number of users may activate the code to bring up an instance of the channel player on their respective computing devices. Each user will then have access to the distribution channel and have independent control over what content to view.

Users may activate a channel player via a link or code on a website associated with the channel management system 102, on a website that is not owned, provided by, or associated with the distribution channel owner (i.e., a non distribution channel owner), or be directed to a stand-alone version of the channel player. The code may not be embedded within a webpage associated with the owner. Instead, the channel player may be accessed, for example, by accessing a link associated with the channel management system 102 website or activating a link which directs the user to the stand-alone channel player. This link may be provided, according to one embodiment, in a communication from the channel owner device 106 to users (e.g., an e-mail message). The stand-alone channel player may comprise a program that installs on a computing device and is executed outside of a web browser. The code may comprise JavaScript which calls the management server 110 to launch the channel player. Accordingly, web events (e.g., webcasts) associated with the distribution channel may be under the control of the distribution channel owner and/or the channel owner device 106.

Users associated with content creator devices 108 may generate and/or submit web events in an origination channel to be distributed via particular distribution channels. For example, users that create web events associated with fund management may submit the web events for distribution via one or more distribution channels categorized as "fund management" distribution channels. The web events may be presented via an aggregated list of web events available via one or more distribution channels in association with a website not necessarily associated with the distribution channel owner, as discussed herein. The distribution channel owner may specify parameters for adding web events to their distribution channel so that web events may be automatically added if the web events comply with the specified parameters. Similarly, the content creator may specify parameters associated with the web event or other content generated so that the web event is appropriately added to proper distribution channel(s). Content creation and categorization is discussed further in association with FIG. 2 and FIG. 3.

The distribution channel owner may arrange for one or more presenters via the content creator device 108 to present events on the owner's distribution channel. The presenters may prepare content for the web event and control the content (e.g., slide changes) during a live web event. In these embodiments, the content creator device 108 may comprise a channel application that allows the presenter to upload the web event content to, or generate content with, the channel management system 102 prior to the live web event. As such, the origination channel, in some cases, is the distribution channel, itself.

The content provider (e.g., the presenter) may also provide audio (e.g., commentary) during the web event. In one embodiment, the audio is provided via the communication network 104 (e.g., VoIP). In an alternative embodiment, the audio is provided via a phone call conducted over a public switched telephone network (PSTN) 113. In this embodiment, the audio may be received by a private branch exchange (PBX) server 114 of the channel management system 102. Integration of live audio communication during a web event is described in U.S. patent application Ser. No. 12/151,768 filed May 8, 2008 and entitled "Systems and Methods for Integrating Live Audio Communication in a Live Web Event," which is hereby incorporated by reference.

The environment 100 also comprises a plurality of subscriber devices 112 associated with users (e.g., registered or unregistered) or subscribers. These subscribers each subscribe to one or more distribution channels associated with the channel management system 102 and/or distribution channel owner. Once subscribed, the subscriber will have access to events (e.g., web events) within the subscribed-to distribution channel via the subscriber device 112. Thus, for example, the subscriber can access archived past web events and view live web events via a browser application on their subscriber device 112. The subscriber device 112 may also access a list of future, planned web events. According to some embodiments, the subscriber may receive communications (e.g. reminders, alerts, or announcements) from the distribution channel owner regarding future web events.

The channel management system 102 may also comprise a resource manager 116. In exemplary embodiments, the resource manager 116 is configured to manage pools of resources. These pools of resources may comprise a group of servers or modules, each of which may provide the same service for an application (e.g., a group of media encoders, slide converters, transcoders). These servers may be real or virtual. In some embodiments, each resource (e.g., server or module) may be allocated to a specific process at a time for a single user.

The exemplary resource manager 116 may monitor the pool of resources in order to allocate resources. For example, if there are twenty media encoders, twelve media encoders are allocated and currently encoding, and three media encoders are in an error state, then five media encoders are available. Thus, when a request for a media encoder is received by the channel management system 102, the resource manager 116 receives the request and allocates one of the available media encoders. The resource manager 116 may also track which users, channel owners, and web events are allocated which resources. The resource manager 116 may be configured to dynamically reallocate resources if a resource fails.

It should be noted that the environment 100 of FIG. 1 is exemplary. Alternative embodiments may comprise additional or fewer elements and still be within the scope of embodiments of the present invention. For example, any number of channel owner devices 106, content creator devices 108, and subscriber devices 112 may be present in the environment 100 at any one time. Furthermore, the channel management system 102 may be comprised of more servers. For example, regional management servers 110 may be provided.

Figure 2:
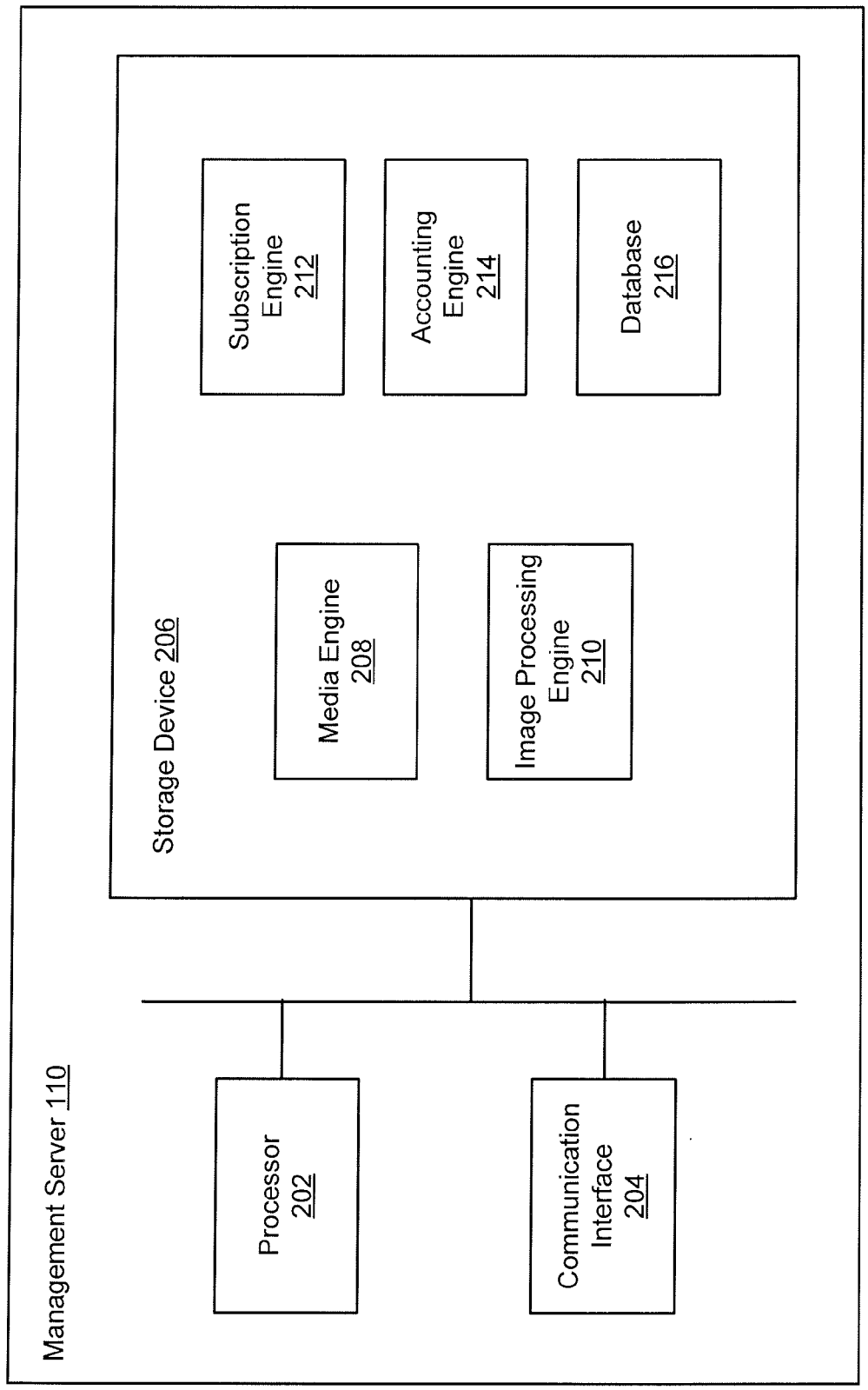
FIG. 2 is a block diagram of an exemplary management server.

Referring now to FIG. 2, an exemplary management server 110 is shown. The management server 110 is configured to organize, maintain, and provide web events via the distribution channels and to allow creation of web events via the origination channels. The management server 110 may include a processor 202, a communication interface 204, and at least one storage device 206. It should be noted that while all these components and associated functionalities are described as operating within a single management server 110, various embodiments contemplate having more than one server for providing the components and functions of the management server 110 and/or more than one of each of the engines, modules, or components within the management server 110. Furthermore, the various components of the channel management system 102 may comprise their own servers coupled in communication. Although various modules are described in association with FIG. 2, fewer or more modules may comprise the management server 110 and still fall within the scope of various embodiments. Further, the functions of the modules may be combined within fewer modules and still be within the scope of embodiments.

The communications interface 204 is utilized to facilitate communication between the various devices, such as the channel owner device 106, the content creator device(s) 108, the subscriber devices 112, and the management server 110. For example, web events may be submitted to the management server 110 from the content creator device(s) 108 via the communications interface 204. Similarly, the communications interface 204 may be utilized to communicate web events to the subscriber devices 112.

The storage device 206 may include one or more devices which function as memory or storage for the management server 110. The exemplary storage device 206 may comprise the media engine 208, an image processing engine 210, a subscription engine 212, an accounting engine 214, and one or more databases 216 (e.g., for storing content and account data).

The exemplary media engine 208 is enabled to provide live web events and/or requested past web events to the subscriber devices 112 via the distribution channels. The media engine 208 may be further configured to allow channel owners and/or content creators to establish web events on the origination channel. The media engine 208 will be discussed in more details in connection with FIG. 3 below.

The image processing engine 210 may be configured to receive and process any images that will be used in live web events. Images can include, but are not limited to, pictures, videos, individual slides, slide shows, animation, or any combination of these images. In some embodiments, the images may comprise slides that will be presented during the live web events. In some embodiments, the images may be stored in the database 216 for access by the subscriber devices 112 during the live web event.

The exemplary subscription engine 212 is configured to manage channel subscribers and/or their subscriber devices 112. In various embodiments, the subscription engine 212 may set up an account for the user, verify the user's identity when requesting access to web events, and provide notifications to users of upcoming web events which may be of interest. The subscription engine 212 may also maintain criteria regarding the subscribers, which enables grouping of the subscribers into target audiences.

The exemplary accounting engine 214 is configured to manage channel owners and/or channel owner devices 106. In some embodiments, the channel owner may pay a fee for establishing the distribution channel, advertising the distribution channel, having audience participation (e.g., pay the audience for attending and responding), purchasing content (e.g., from content providers), and/or for other functions and services provided by the channel management system 102. The distribution channel owner may also receive fees for audience attendance, from purchased content, or from sponsors, for example. The accounting engine 214 may maintain records of all these fees.

In particular, the accounting engine 214 may generate and/or track fees associated with the distribution of the web event(s). However, according to some embodiments, the web event(s) are distributed without any associated fees. The content creator may specify a fee or rate that the content creator is willing to pay to have the web event(s) distributed. For example, the content creator may pay $10 per viewing of the web event by a specified target audience. Accordingly, the distribution channel owner may receive payment for distributing the various web event(s).

As will be discussed herein, the distribution channel owner may select one or more web event(s), or one or more campaigns including a plurality of web events to distribute on their distribution channel. According to exemplary embodiments, the distribution channel owner specifies parameters for web events. If the web events from the origination channel(s) comply with the parameters, the web events or campaigns that comply may be automatically added to the distribution channel offering and distributed through the distribution channel. In a further embodiment, the distribution channel owner may remove web event(s) that the distribution channel owner finds inappropriate. In alternative embodiments, the distribution-channel owner may select web event(s) from origination channel(s) to add to their distribution channel based on the parameters. For example, the distribution channel owner may select the web event(s) to distribute based on a payment and/or payment scheme specified by the content creator. The distribution channel owner may then receive payment for distributing the web event(s).

In exemplary embodiments, an owner associated with the management server 110 (i.e., management server owner) receives a percentage or other form of payment associated with the distribution of the web event(s). For example, the management server owner may receive a percentage of pay-per-view fees for each web event generated, managed, and/or distributed via the management server 110. As discussed herein, the management server 110 may allow the content creators to target various audiences by grouping the users that are subscribers according to one or more criteria. The accounting engine 214 may be utilized to track money owed by the content creators, money due to the distribution channel owners that distribute the web event(s), and/or money due to the management server owner.

Figure 3:
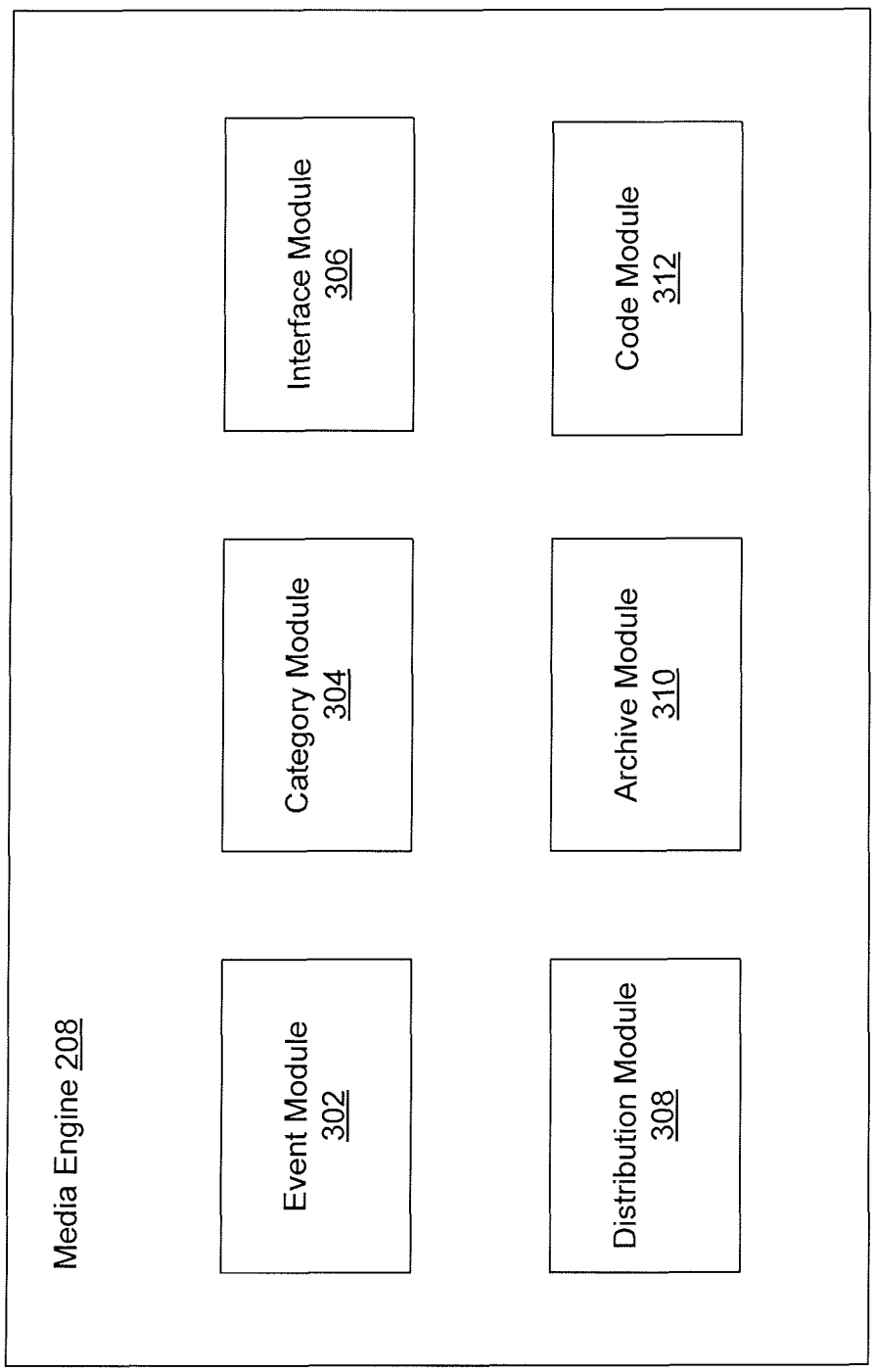
FIG. 3 is a block diagram of an exemplary media engine.

Referring now to FIG. 3, the media engine 208 is shown in more detail. In exemplary embodiments, the media engine 208 is configured to allow creation of web events via origination channels and distribution of web events via distribution channels. As such, the media engine 208 may generate and provide live web events and requested past web events to subscriber devices 112 via the channel player. The media engine 208 may include an event module 302, a category module 304, an interface module 306, a distribution module 308, an archive module 310, and a code module 312. The media engine 208 may include more, less, or functionally equivalent modules and still be within the scope of present embodiments.

The event module 302 is configured to allow the channel owner (e.g., via the channel owner device 106) and/or the content providers (e.g., via the content creator device 108) to establish and manage web events in an origination channel. The event module 302 may provide an interface which allows the channel owner or content provider to enter details of a new event. The details may comprise title of the web event, description, event time, and so forth. A user associated with the content creator device 108 may create a campaign of one or more web events via the event module 302, as will be discussed below.

Once the scheduling instructions are processed, the web event may be available for listing on the origination channel. Web events that match certain parameters of a distribution channel may be automatically added to the listing of web events for the distribution channel. The web events may be provided to distribution channel owners based on the parameters, and the distribution channel owner may select web events to add to their distribution channel. The event module 302 may aggregate these listings of upcoming and archived events in the origination and distribution channel.

The category module 304 is utilized to specify parameters associated with the web event(s) generated and/or submitted via the event module 302. The category module 304 may offer one or more parameters, or categories, for the content creators to associate with the web event(s) being created in the origination channel. Similarly, the category module 304 may be utilized to allow distribution channel owners to specify parameters associated with web event(s) the distribution channel owners seek to distribute via their distribution channel(s). The functions of the category module 304 may be combined with the functions of the event module 302.

A content creator may specify that the web event being created is associated with a particular technology sector and keywords. Any number of parameters may be utilized to categorize the web event(s). For example, the web event may simply be directed to anyone that is interested in fund management while in another instance, the web event may be directed to subscribers from the U.S. in a health sector that are medical doctors or are interested in subject matter of interest to medical doctors. By categorizing the web event(s), distribution channel owners may search for web event(s) that the distribution channel owners may be interested in distributing via their distribution channels. Accordingly, for example, a company may search for web events to distribute via its website and distribution channels for categories such as technology, finance, and engineering.

Further, categorizing the web event(s) allows the content creator to target specific audiences. For example, the content creator may target subscribers in the UK that are interested in data warehousing parameters directed to the same. The content creator can then submit the web event(s) to be distributed by distribution channel owners that are interested in distributing web event(s) to UK subscribers interested in data warehousing.

The exemplary interface module 306 provides various interfaces on the channel player. One such interface comprises a listing of one or more web events (e.g., distribution-channel listing). The web events may comprise any combination of past, current, and/or future events. The interface module 306 may work in connection with the event module 302 to provide interfaces to the content provider or channel owner which allows the content provider or channel owner to perform scheduling, set-up, and preparation functions, as well as to set up campaigns and preferences for adding web events to distribution channels. In alternative embodiments, the interface may be provided by the event module 302. Examples of these interfaces are provided and discussed in more detail below.

The distribution module 308 is configured to provide data to the subscriber devices 112 and content creator device 108. The data may include live and archived events. The distribution module 308 may be utilized to distribute the web event(s) to subscribers according to the parameters specified by the content creator. For example, the distribution module 308 may compare the parameters to a database of subscribers to ensure that only subscribers that match the parameters, or criteria, are offered particular web events. One or more distribution channels or web events may only be offered to subscribers that meet the criteria associated with the parameters. For example, if one of the parameters specified is that the audience members be UK residents, and a U.S. user logs in to search for web events associated with the distribution channel that specified UK residents, the U.S. user may not be presented with the web events specified for UK residents. Any number of parameters and/or criteria may be specified by the content creators and/or the distribution channel owners.

Live web event may be archived by the archive module 310 and stored immediately or relatively soon after the distribution of the live web event. The archived event may be stored in the database 216 (e.g., content database). The listing of the web events on the distribution channel may then be updated by the interface module 306 to indicate that the previous live web event is now an archived web event. Subsequently, the subscriber devices 112 may access and request archived web events via the distribution module 308. It should be noted that the functions of the interface module 306 and the distribution module 308 may be combined within a single module.

The exemplary code module 312 is configured to generate the embeddable code which provides access to the distribution channel and provides an instance of the channel player on a subscriber device 112 and/or content creator device 108. The code may comprise generic coding to provide the channel player on a browser of the user activating the code. The code may also comprise a specific tag to indicate a particular distribution channel. In some embodiments, embedded code may comprise a tag that takes a user directly to a web event. For example, the tag may comprise a channel ID and web event ID, activation of which takes the user directly to the web event identified by the web event ID.

It should be noted that the management server 110 of FIG. 2 and the media engine 208 of FIG. 3 are exemplary. Additional or fewer modules may be implemented and still fall within the scope of the present technology. Some components unnecessary for operation of embodiments of the present invention are not discussed. Further, the functions of the modules may be combined within fewer modules and still fall within the scope of embodiments. In some embodiments, the various modules may comprise one or more servers.

Figure 4:
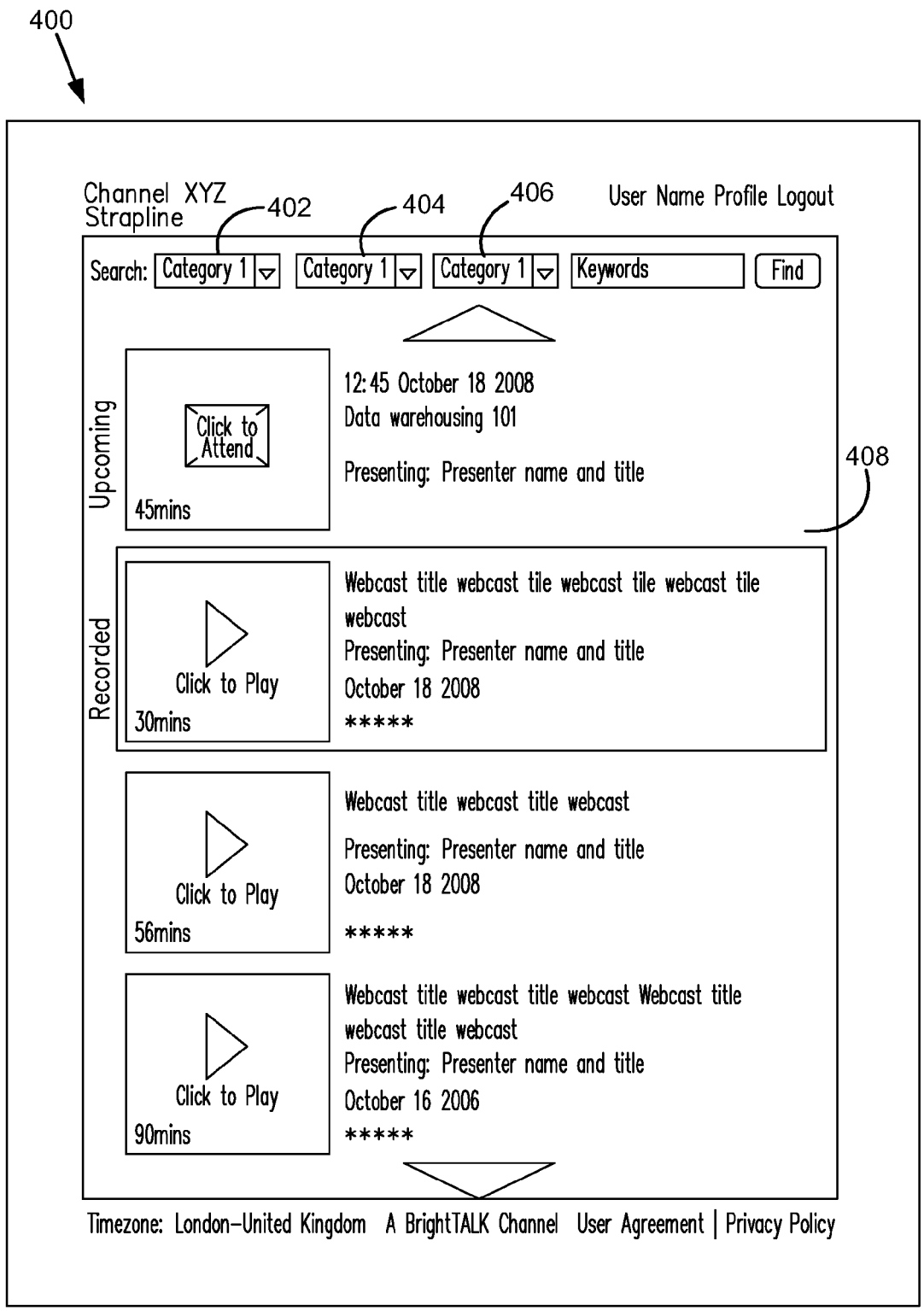
FIG. 4 is an interface providing exemplary web event information associated with a distribution channel.

FIG. 4 is an interface 400 providing exemplary web event information associated with a distribution channel. The web events may be optionally filtered by categories 402, 404 and 406, such as technology group, topic, and types. For example, the technology group may comprise a technology company name. Content details 408 may display various types of information about the web events, such as date, title, presenters, source of the web event, and a review or rating information for the event. The web events may be categorized as upcoming or recorded (i.e., archived).

In the example of FIG. 4, the distribution channel may provide web events from a plurality of different sources (e.g., groups). For example, both upcoming and recorded web events may be provided such as upcoming web event "Data warehousing 101." Each of these sources may comprise an origination channel from which the web event may be obtained from to be distributed via the distribution channel.

FIG. 5 is an interface 500 providing web event information for a distribution channel. The interface 500 may provide a list of web events 502 in an origination channel, for example. The user (e.g., content creator) may use the "Create" button 504 to add an archived event or upcoming event. As discussed herein, the event module 302 may be utilized to generate the web events, such as the web events shown in FIG. 5. Utilizing the web event list 502, the user may perform various tasks related to the web events, such as viewing and editing the created web events. The interface 500 may also incorporate an RSS feed to publish information regarding content (e.g. a web page, web event, text, audio, video) provided through a particular channel, including content generated from another origination or distribution channel. In some embodiments, content associated with a web event may be streamed via a website using RSS feeds.

Figure 6:
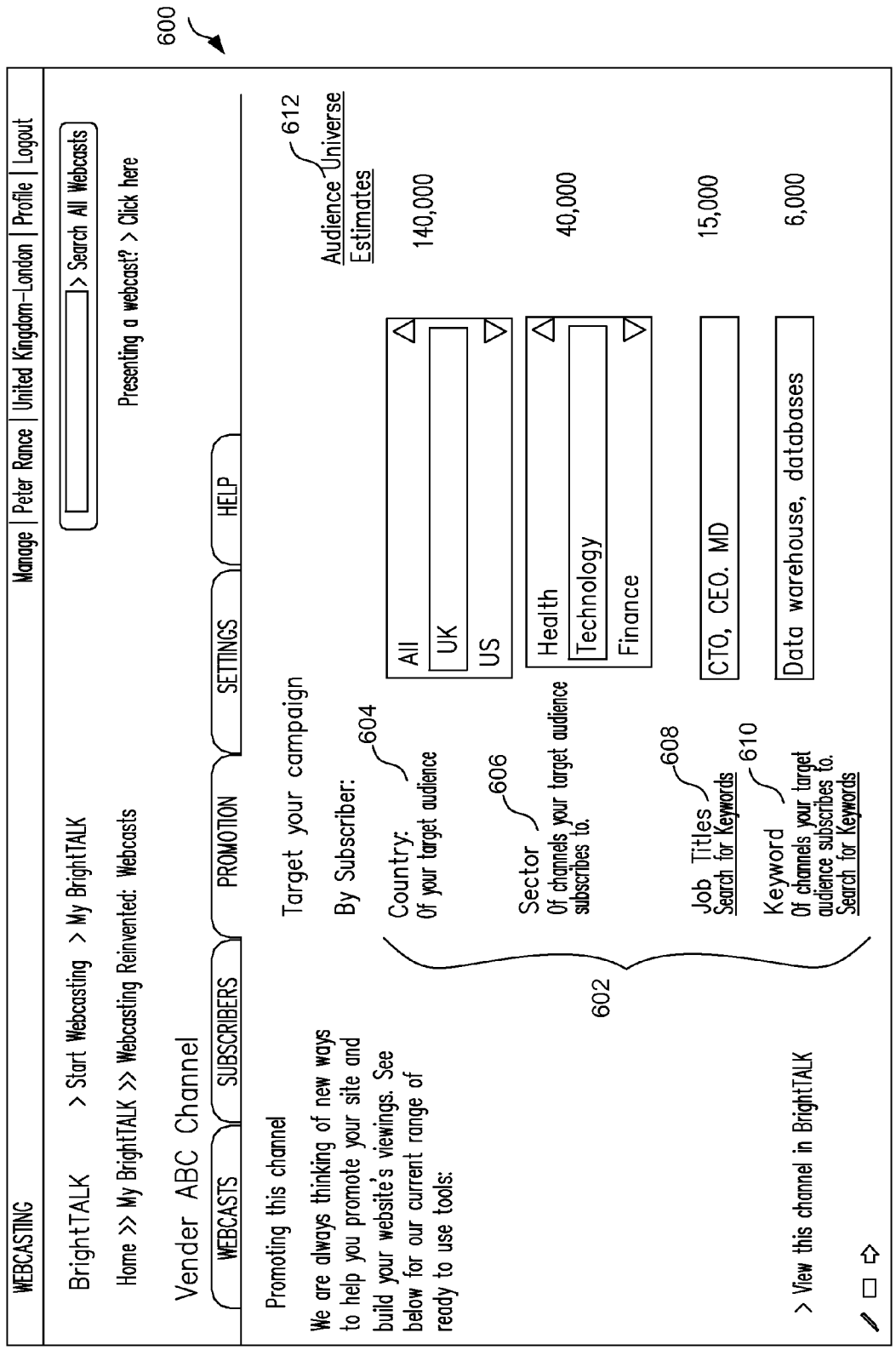
FIG. 6 is an interface for identifying a target for a channel.

FIG. 6 is an interface 600 for identifying a target for a distribution channel. As discussed herein, subscribers may be specified as targeted or identified audience members utilizing various parameters. In FIG. 6, the interface 600 may have a portion 602 that allows a user to provide information regarding various audience categories, such as a subscriber country 604, subscriber sector 606, subscriber job title 608, and/or subscriber keywords 610 associated with the identified audience. Because the audience (i.e., subscribers) are registered with the channel management system 102, the audience may be identified and various audience parameters known by the management server 110.

Audience universe estimates 612 may also be provided to the user to indicate how many subscribers comprise each category. The user may use the audience universe estimates 612 to narrow the identified subscribers and/or to decide whether or not to target the subscribers utilizing certain of the audience categories. Any number of the audience categories may be selected by the user.

It should be noted that fewer or more audience categories and/or other categories may be provided for generating a campaign in alternative embodiments. As discussed herein, the campaign may be comprised of more than one web event. In exemplary embodiments, the category module 304 may be utilized to provide and/or allow selection of the various categories (e.g., the audience categories illustrated in portion 602 of interface 600).

FIG. 7 is an interface 700 for adding webcast to a channel. The promotion interface 700 may be utilized to add webcasts to one or more campaigns. A campaign involves a channel owner distributing content in a channel owned by other channel owners. In one embodiment, a distribution channel owner sets forth content (e.g. web pages, web events, audio, and/or video) for distribution and consents to the distribution of the content. As discussed, each of the webcasts 702 and/or the campaigns may be categorized according to various parameters such as country of target audience, type of industry or sector, speaker job title, or any other parameter. The various parameters may then be matched with parameters specified by the distribution channel owners so that the campaigns and/or the webcasts 702 may be added to the appropriate distribution channels in accordance with exemplary embodiments. Preferably, the matching of parameters of web event content to a particular distribution channel occurs automatically. Alternatively, the campaigns and/or web events may be offered for inclusion in appropriate distribution channels.

In FIG. 7, each of the webcasts 702 may be selected to be added to the campaign created by the user. Alternatively, an all-inclusive box 704 may be provided in order to add all of the webcasts 702 into the campaign. The user may provide the campaign as part of the user's own distribution channel and/or submit the campaign for distribution via other owner's distribution channels.

FIG. 8 is an interface 800 for managing a campaign for a channel. The distribution channel owner may utilize the interface 800 to select one or more campaigns and webcasts of the campaigns to distribute. In some embodiments, the distribution channel owner may profit from the distribution of the campaigns by being paid a fee for the distribution.

As shown, various $3^{rd}$ party campaigns 802 are displayed. A distribution channel category 804 to which each of the $3^{rd}$ party campaigns 802 relates is also provided. A number of webcasts 806 (i.e., web events) within each of the $3^{rd}$ party campaigns 802 is shown along with ratings 808 associated with the 3$^{rd}$ party campaigns 802. Various payment scheme 810, such as pay-per-view (i.e., PPV), pay-to-attend, pay-per-subscriber (i.e., PPS), and so forth, is then provided for each campaign 802. These payment schemes relate to rates 812 per person (i.e., subscriber) the distributed channel owner is paid for distributing the web event. In alternative embodiments, the distribution channel owner may pay the content provider for providing the web event(s).

The distribution channel owner may search for 3$^{rd}$ party campaigns to distribute via their distribution channel. The distribution channel owner may then select via selection boxes 814 the 3$^{rd}$ party campaigns they want to distribute. In other embodiments, the campaign or web events may be automatically added based on parameters. In some embodiments, the distribution channel owner, or other user, may sort the 3$^{rd}$ party campaigns 802 according to a category or type, using a "sort by scheme" 816. Any type of sorting may be provided.

Figure 9:
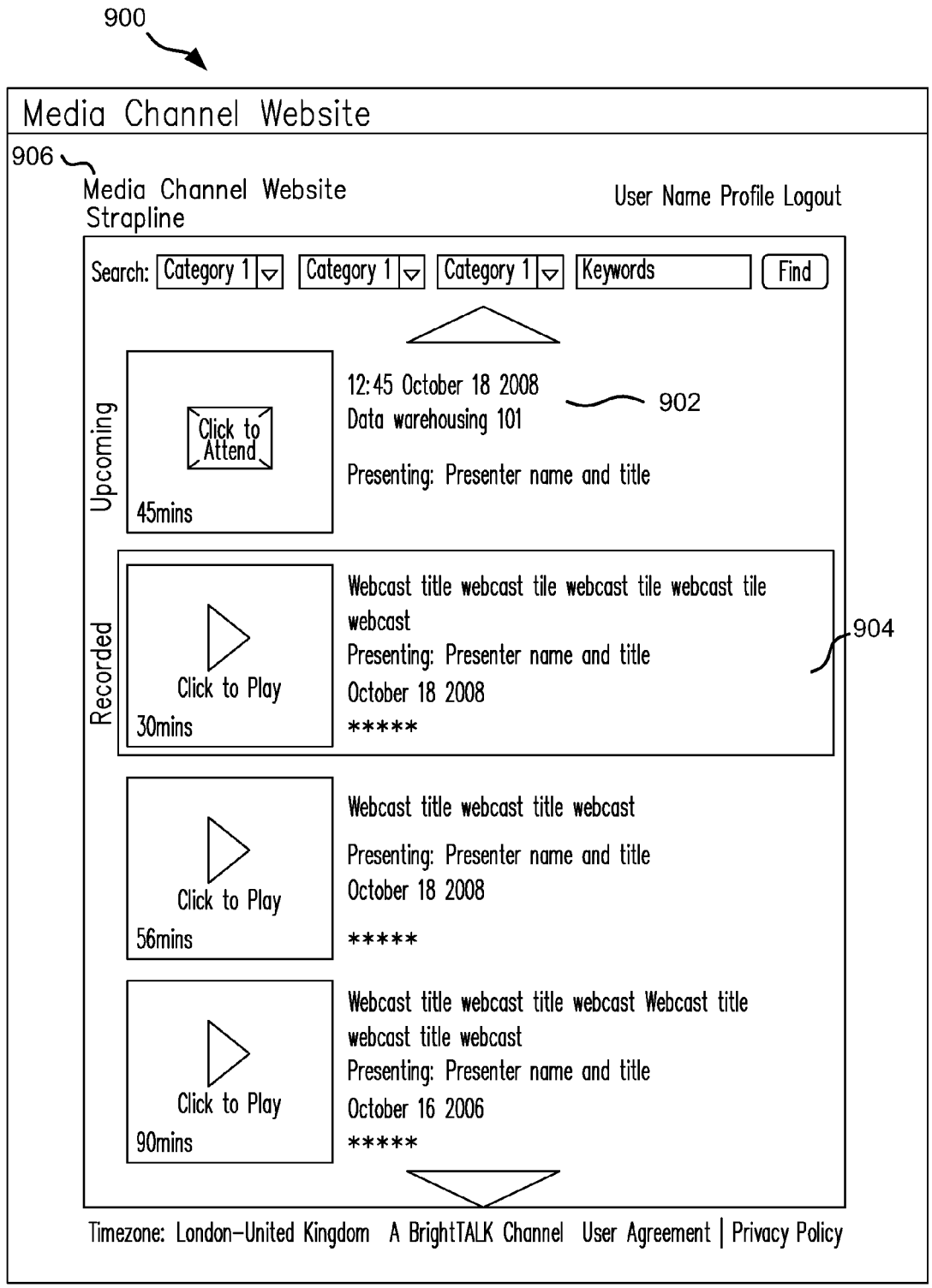
FIG. 9 is an interface of a web page with an embedded channel.

FIG. 9 is an interface 900 of a web page with an embedded distribution channel. A company web event 902, such as "Data warehousing 101" exemplified in FIG. 9, is displayed. In the present example, the presenter requested that its generated web events be distributed only to UK subscribers interested in "Webcast title webcast title webcast tile webcast". Accordingly, the web event titled "Webcast title webcast title webcast tile webcast" 904 appears within the distribution channel displayed on a website associated with the distribution channel owner, Media Company 906. However, the distribution channel owner will not offer the web event titled "Webcast title webcast title webcast tile webcast tile webcast" 904 to subscribers that do not match the description (i.e., fall outside the specified parameters) of UK subscribers interested in Webcast title webcast title webcast tile webcast tile webcast.

Figure 10:
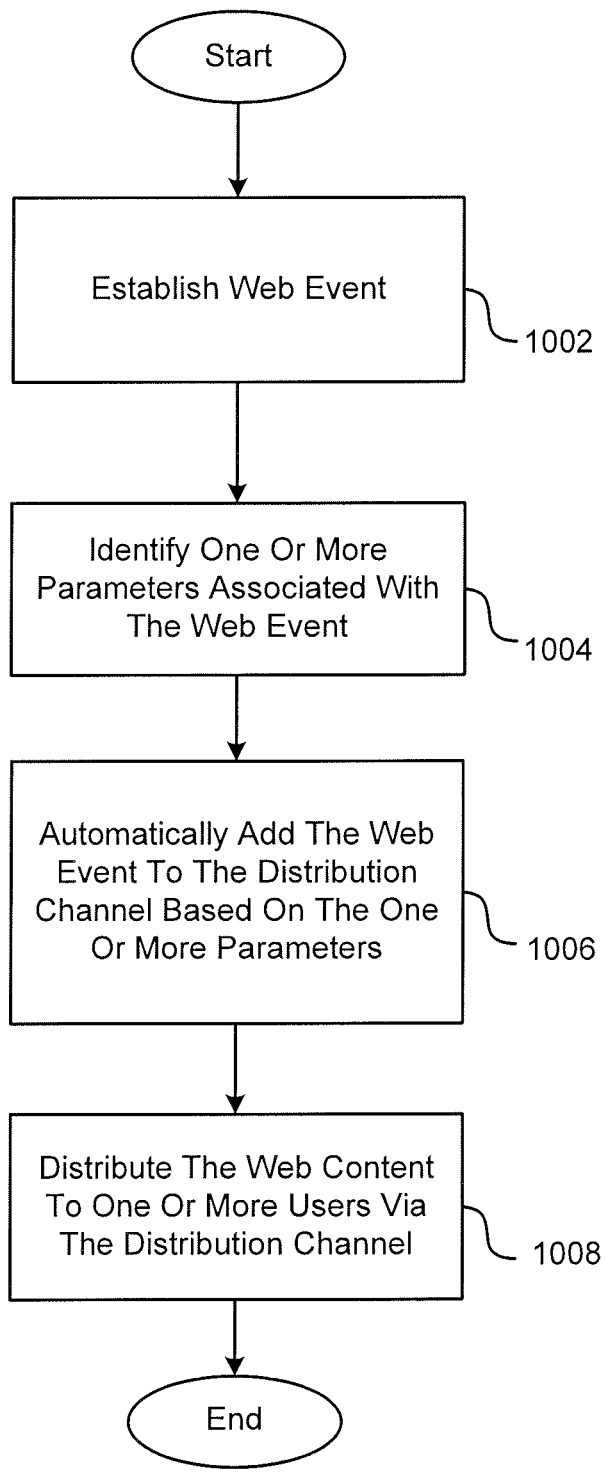
FIG. 10 is a flowchart of an exemplary process for distributing web events via distribution channels.

FIG. 10 is a flow diagram showing an exemplary process for distributing web events via distribution channels. At step 1002, a web event associated with an origination channel is established. As discussed herein, the web event may be established by any content provider or channel owner utilizing the event module 302. Any party may establish or create the web event.

At step 1004, one or more parameters associated with the web event are identified. As discussed herein, the category module 304 associated with the management server 110 may be utilized to specify parameters. The parameters may include target audience criteria, payment schemes, fees, ratings, web event type, and/or any other parameters or categories. In one embodiment, the parameter may comprise a distribution channel category of a campaign. The creator of the web content may specify parameters associated with the web content and, similarly, the distribution channel owner may specify parameters associated with web content that the distribution channel owner is willing to distribute. As discussed herein, the web content may be distributed for a fee or for free.

At step 1006, the web content may be added to appropriate distribution channel(s) based on the one or more parameters. The distribution module 308 discussed herein may add the web content as a feed, such as an RSS feed, to the distribution channel associated with a website related to the distribution channel owner based on the parameters. In some embodiments, the web event may be automatically added based on the one or more parameters. For example, if the distribution channel owner specifies that the distribution channel owner will distribute web events within the category of financial management, web events submitted within the category of financial management may be automatically added to the distribution channel. In other embodiments, the management server 110 may verify, prior to adding the web event to the distribution channel, that the web event fits within the category specified by the content creator, or other user, that submits the web event. In yet another embodiment, the distribution channel owner may manually review and select web events to add to the distribution channel.

At step 1008, the web event is distributed to one or more users via the distribution channel. As discussed herein, the identified users may be targeted by campaigns comprised of one or more web events. The management server 110 may allow the content provider to provide audience parameters. According to some embodiments, fees may be charged based on a number of users reached via the audience parameters and/or any other parameters. In some embodiments, the content creator may specify a budget associated with the campaign the content creator is submitting for distribution.

As discussed herein, the method of distribution comprises embedding access to the distribution channels into a website of the distribution channel owner, according to exemplary embodiments. The distribution channel may display different web events to different subscribers based on the audience parameters and/or any other type of parameters. For example, the management server 110 may generate and/or access user profiles associated with subscribers. The user profiles may then be utilized to determine whether the user profiles match the audience criteria specified by the parameters selected by the content creator.

Figure 11:
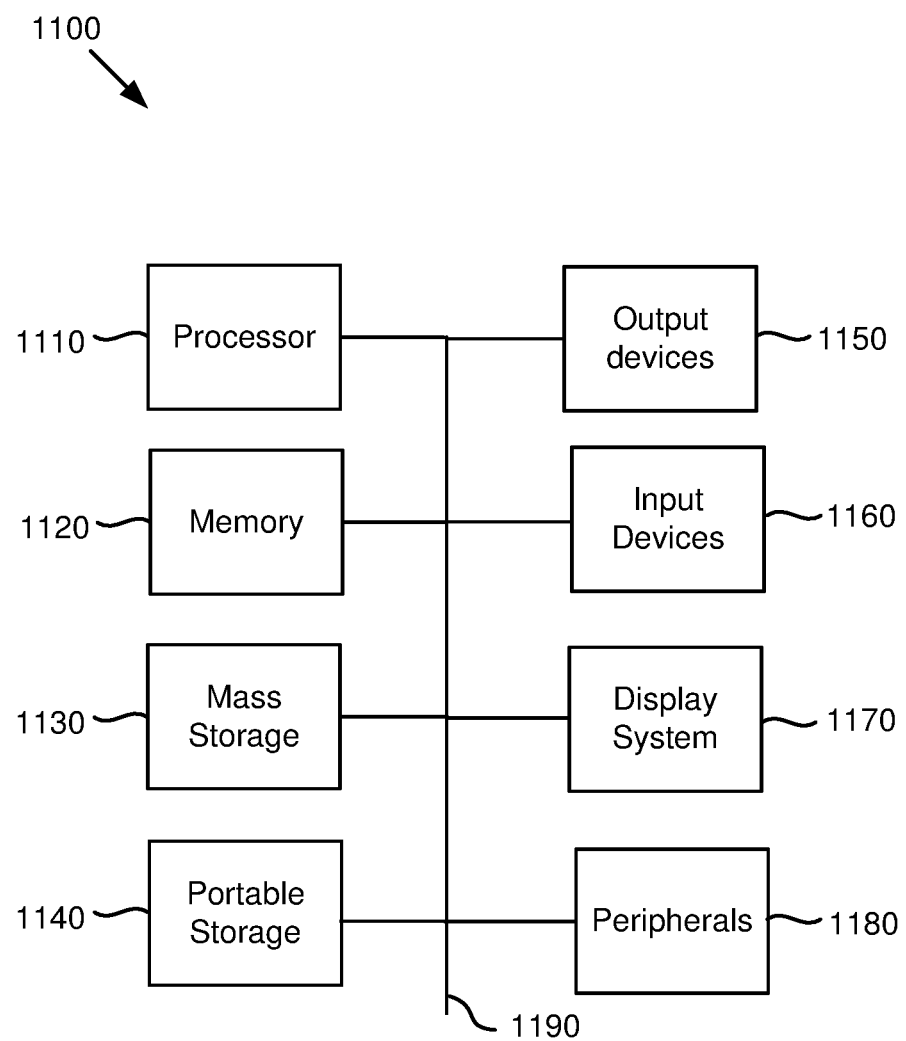
FIG. 11 is a block diagram of an exemplary computing device for implementing the present technology.

FIG. 11 is a block diagram of an exemplary computing device for implementing the present technology. FIG. 11 illustrates an exemplary computing system 1100 that may be used to implement an embodiment of the present invention. System 1100 of FIG. 11 may be implemented in the contexts of the likes of channel management system 102, content creator device 108, subscriber devices 112, and owner devices 106. The computing system 1100 of FIG. 11 includes one or more processors 1110 and memory 1120. Main memory 1120 stores, in part, instructions and data for execution by processor 1110. Main memory 1120 can store the executable code when in operation. The system 1100 of FIG. 11 further includes a mass storage device 1130, portable storage medium drive(s) 1140, output devices 1150, user input devices 1160, a display system (e.g., graphics display) 1170, and peripheral devices 1180.

The components shown in FIG. 11 are depicted as being connected via a single bus 1190. However, the components may be connected through one or more data transport means. For example, processor unit 1110 and main memory 1120 may be connected via a local microprocessor bus, and the mass storage device 1130, peripheral device(s) 1180, portable storage device 1140, and display system 1170 may be connected via one or more input/output (I/O) buses.

Mass storage device 1130, which may be implemented with a magnetic disk drive or an optical disk drive, is a non-volatile storage device for storing data and instructions for use by processor unit 1110. Mass storage device 1130 can store the system software for implementing embodiments of the present invention for purposes of loading that software into main memory 1120.

Portable storage device 1140 operates in conjunction with a portable non-volatile storage medium, such as a floppy disk, compact disk or Digital video disc, to input and output data and code to and from the computer system 1100 of FIG. 11. The system software for implementing embodiments of the present invention may be stored on such a portable medium and input to the computer system 1100 via the portable storage device 1140.

Input devices 1160 provide a portion of a user interface. Input devices 1160 may include an alpha-numeric keypad, such as a keyboard, for inputting alpha-numeric and other information, or a pointing device, such as a mouse, a trackball, stylus, or cursor direction keys. Additionally, the system 1100 as shown in FIG. 11 includes output devices 1150. Examples of suitable output devices include speakers, printers, network interfaces, and monitors.

Display system 1170 may include a liquid crystal display (LCD), LED display, plasma display or other suitable display device. Display system 1170 receives textual and graphical information, and processes the information for output to the display device.

Peripherals 1180 may include any type of computer support device to add additional functionality to the computer system. For example, peripheral device(s) 1180 may include a modem or a router.

The components contained in the computer system 1100 of FIG. 11 are those typically found in computer systems that may be suitable for use with embodiments of the present invention and are intended to represent a broad category of such computer components that are well known in the art. Thus, the computer system 1100 of FIG. 11 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The above-described components and functions can be comprised of instructions that are stored on a computer-readable storage medium. The instructions can be retrieved and executed by a processor (e.g., processor 202). Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

While various embodiments have been described above, it should be understood that they have been presented by way of example only, and not limitation. For example, any of the elements associated with the management server 110 may employ any of the desired functionality set forth hereinabove. Thus, the breadth and scope of a preferred embodiment should not be limited by any of the above-described exemplary embodiments.

What is claimed is:

1. A method for distributing web events, comprising:
establishing an origination channel;
establishing a web event by an owner of the web event in the origination channel, the web event comprising online content synchronized with live audio;
streaming the web event from the origination channel to a plurality of content pages;
embedding a code within each of the plurality of content pages;
identifying one or more parameters associated with the web event, the one or more parameters comprising a classification of the web event based on a subject matter of the web event;
designating by the owner of the web event a distribution channel to add the web event, the distribution channel having a grouping of web events based on the subject matter of the web event;
adding the web event to the distribution channel, the distribution channel having access to the web event from the plurality of content pages;
monitoring by the distribution channel traffic and activities on each of the plurality of content pages via the embedded code on each of the plurality of content pages communicating with the distribution channel;
providing by the distribution channel information to the owner of the web event about the traffic and the activities on each of the plurality of content pages;
distributing the web event to an audience of viewers via the distribution channel, the distribution channel comprising content originally from a channel other than the distribution channel; wherein adding the web event comprises allowing a distribution channel owner to select from a list of appropriate web events determined based on the one or more parameters;
associating fees with the distribution of the web event via the distribution channel; and
wherein the origination channel is associated with a first channel owner that is different from a second channel owner associated with the distribution channel.

2. The method of claim 1, wherein establishing the web event comprises receiving the one or more parameters associated with the web event from a content creator.

3. The method of claim 1, wherein establishing the web event comprises establishing a campaign comprising at least the web event.

4. The method of claim 1, wherein adding the web event comprises automatically adding the web event to the distribution channel based on the one or more parameters and parameters specified by the distribution channel.

5. The method of claim 1, wherein the one or more parameters comprise a payment scheme.

6. The method of claim 1, wherein the one or more parameters comprise a distribution channel category of a campaign.

7. The method of claim 1, wherein the one or more parameters comprise a rating for a first identified user of the distribution channel, the rating comprising an assessment of relevance of the web event for the first identified user.

8. The method of claim 1, further comprising automatically categorizing the web event based on the one or more parameters.

9. The method of claim 1, further comprising providing an updated aggregated list of web events available upon adding the web event to the distribution channel.

10. The method of claim 1, further comprising embedding access to the distribution channel into a website associated with an owner of the distribution channel.

11. A system for distributing web events, comprising:
an event module configured to establish a web event in an origination channel by an owner of the web event, the web event comprising online content synchronized with live audio, the event module configured to stream the web event from the origination channel to a plurality of content pages, to embed a code within each of the plurality of content pages, and configured to add the web event to a distribution channel based on one or more parameters associated with the web event, and parameters specified by the distribution channel, the one or more parameters comprising a classification of the web event based on a property of the web event;

a distribution module configured to distribute the web event to an audience of viewers via the distribution channel, the distribution channel comprising content originally from a channel other than the distribution channel and having a grouping of web events based on a subject of the web event, the distribution channel having access to the web event from the plurality of content pages and monitoring traffic and activities on each of the plurality of content pages via the embedded code on each of the plurality of content pages communicating with the distribution channel, and the distribution channel providing information to the owner of the web event about the traffic and the activities on each of the content pages; wherein adding the web event comprises allowing a distribution channel owner to select from a list of appropriate web events determined based on the one or more parameters;

associating fees with the distribution of the web event via the distribution channel; and wherein the origination channel is associated with a first channel owner that is different from a second channel owner associated with the distribution channel.

12. The system of claim 11, further comprising a category module configured to identify the one or more parameters associated with the web event.

13. The system of claim 11, further comprising an accounting engine configured to associate fees with distribution of the web event via the distribution channel and maintain an accounting of the fees.

14. The system of claim 11, wherein the event module automatically adds the web event to the distribution channel based on the one or more parameters and the parameters specified by the distribution channel.

15. The system of claim 11, wherein the event module automatically generates a list of appropriate web events determined based on the one or more parameters from which a distribution channel owner may select from, the list of appropriate web events comprising web events that meet the one or more parameters selected by the distribution channel owner.

16. A non-transitory machine readable medium having embodied thereon a program, the program being executable by a processor for performing a method for distributing web events, the method comprising:

establishing a web event in an origination channel, the web event having a web event owner and comprising online content synchronized with live audio;

streaming the web event from the origination channel to a plurality of content pages;

embedding a code within each of the plurality of content pages;

identifying one or more parameters associated with the web event, the one or more parameters comprising a classification of the web event based on a property of the web event;

designating a distribution channel to add the web event, the distribution channel having a grouping of web events based on the property of the web event;

adding the web event to the distribution channel, the distribution channel having access to the web event from the plurality of content pages;

monitoring traffic and activities on each of the plurality of content pages via the embedded code on each of the plurality of content pages communicating with the distribution channel;

providing information to the owner of the web event about the traffic and the activities on each of the plurality of content pages;

distributing the web event to an audience of viewers via the distribution channel, the distribution channel comprising content originally from a channel other than the distribution channel; wherein adding the web event comprises allowing a distribution channel owner to select from a list of appropriate web events determined based on the one or more parameters;

associating fees with the distribution of the web event via the distribution channel; and wherein the origination channel is associated with a first channel owner that is different from a second channel owner associated with the distribution channel.

\* \* \* \* \*